United States Patent
Kaneko et al.

(10) Patent No.: US 6,820,801 B2
(45) Date of Patent: Nov. 23, 2004

(54) REMOTE CONTROL SYSTEM (75) Inventors: Taichi Kaneko, Tokyo-to (JP); Tomoharu Takano, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 10/240,690

(22) PCT Filed: Feb. 5, 2002

(86) PCT No.: PCT/JP02/00925

§ 371 (c)(1),
(2), (4) Date: Oct. 3, 2002

(87) PCT Pub. No.: WO02/063523

PCT Pub. Date: Aug. 15, 2002

(65) Prior Publication Data

US 2003/0136827 A1 Jul. 24, 2003

(30) Foreign Application Priority Data

Feb. 6, 2001 (JP) .......................................... 2001-28994

(51) Int. Cl.⁷ ............................................. G06F 17/00
(52) U.S. Cl. ...................................................... 235/375
(58) Field of Search ................................ 235/375, 435, 235/487, 376; 705/41; 340/825.49, 825.22, 825.72; 725/152, 37; 700/9

(56) References Cited

U.S. PATENT DOCUMENTS

| | | | | |
|---|---|---|---|---|
| 5,235,328 A | * | 8/1993 | Kurita | 340/825.72 |
| 5,579,386 A | * | 11/1996 | Koda | 379/252 |
| 6,069,672 A | * | 5/2000 | Claassen | 348/734 |
| 6,131,111 A | * | 10/2000 | Yoshino et al. | 709/204 |
| 6,223,348 B1 | * | 4/2001 | Hayes et al. | 725/152 |
| 6,282,451 B1 | * | 8/2001 | White | 700/22 |
| 6,563,430 B1 | * | 5/2003 | Kemink et al. | 340/825.49 |
| 6,636,272 B1 | * | 10/2003 | Noguchi et al. | 348/734 |
| 2002/0084909 A1 | * | 7/2002 | Stefanik et al. | 340/825.22 |

FOREIGN PATENT DOCUMENTS

| | | | | |
|---|---|---|---|---|
| CA | 2083471 A | * | 9/1994 | G08C/19/36 |
| EP | 907156 A2 | * | 4/1999 | G08C/19/28 |
| JP | 2000030010 A | * | 1/2000 | G06K/17/00 |
| JP | 200 0106694 | | 4/2000 | |
| JP | 200 0299891 | | 10/2000 | |

* cited by examiner

Primary Examiner—Michael G. Lee
Assistant Examiner—Uyen-Chau N. Le
(74) Attorney, Agent, or Firm—Ladas & Parry LLP (57) ABSTRACT

The remote control system utilizes a mobile communication terminals 20, the IC card 201 a the mobile communication network to remotely control home-electronics information terminals 11 to 15, 19, 40. In an automatic control mode, when it is detected that the user's mobile communication terminal 20 is moved from the cell area EL where the house is to the neighboring area CR, the mobile communication terminal commands the change of the specific home-electronics information terminal to Going-out status. When it is detected that the user's mobile communication terminal 20 is moved from the neighboring area CR to the cell area EL, the mobile communication terminal commands the change of the specific home-electronics information terminal to Staying status. In such a system, the user can deliberately issue control command in the manual mode.

8 Claims, 7 Drawing Sheets

REMOTE CONTROL SYSTEM

CROSS-REFERENCES TO RELATED APPLICATIONS

This application is a 371 of PCT/JP02/00925 filed Feb. 5, 2002. This application also claims priority based on Japan patent application no. 2001-28994 filed Feb. 6, 2001.

BACKGROUND OF THE INVENTION

1. Field of the Invention

This invention relates to a control system utilizing a mobile communication terminal and an IC card to be installed in the mobile communication terminal. This invention also relates to a mobile communication terminal and an IC card used for the above control system.

2. Description of Related Art

A Japanese laid-open patent application No. 3-182965, entitled "A total home control system" discloses a system in which a plurality of various home-electronics equipments are totally and centrally controlled by a single controller by using a control program stored in a card-type storage medium and individual identification information of ID detector. By this system, the home-electronics equipments in a house are controlled in conformity with life style of a user.

In the system disclosed in the Japanese laid-open patent application No. 3-182965, a control program to control various home-electronics equipments to meet the life style of a user is stored in a card-type storage medium. An ID detector is installed in each room of users, and each user has an ID card identifying himself or herself.

A card reader/writer reads out the control program of the home-electronics equipments for each individual stored in the IC card, and writes it into the program memory of the controller. Based on the control program for the individual corresponding to detected output from the ID detector, the controller controls various home-electronics equipments. Therefore, each individual does not have to individually switch on and off the home-electronics equipments in the room, and thus the user can have comfortable and convenient life that meets his or her life style.

However, the above-mentioned system is quite different from a system in which various home-electronics equipments in the house are controlled from outside of the house. Specifically, the above-mentioned system does not use mobile communication terminals broadly used in these days, and hence it cannot achieve remote control of the home-electronics equipments from outside of the house.

In a modern life style, there is a need to automatically control home-electronics equipments in an absent house from outside. However, no such consideration was made in the above-mentioned system, and remarkable improvement of convenience in human life cannot be expected.

SUMMARY OF THE INVENTION

It is an object of the present invention to overcome the above-mentioned problem, and the present invention provides a system in which various home-electronics information terminals are automatically or deliberately controlled by using a mobile communication terminal and an IC card installed therein to communicate with the home-electronics information terminals installed in the house. Thereby, for example, the home-electronics information terminals can be switched ON and OFF, the condition thereof can be changed, and/or an electronic locking system can be locked and/or unlocked.

According to one aspect of the present invention, there is provided a remote control system for remotely controlling home-electronics information terminals by a mobile communication terminal with IC card, wherein the IC card includes: a comparing means for comparing a location information, such as cell ID, received from the mobile communication terminal with residential area information and area status information stored in the IC card; and a determining means for determining whether the mobile communication terminal moves into or out of a residential area based on the comparison result of the comparing means, wherein the mobile communication terminal includes: a notifying means for notifying the location information, such as cell ID, and the changed location information to the IC card whenever a change is detected; a first commanding means for sending a command automatically to a home-electronics information terminal with wireless communication function installed in a house via a mobile communication network to set the home-electronics information terminal to a preset Going-out status when it is determined that the mobile communication terminal moves out of the residential area; and a second commanding means for sending a command automatically to the home-electronics information terminal with wireless communication function installed in the house via the mobile communication network to set the home-electronics information terminal to a preset Staying status when it is determined that the mobile communication terminal moves into the residential area.

By this system, the user does not forget switching off or does not perform erroneous setting of the home-electronics information terminal when he or she goes out of the residential area. When the user goes into the residential area, the home-electronics information terminal can be powered on, in advance, or set to a predetermined setting condition in advance.

According to another aspect of the present invention, there is provided a remote control system for remotely controlling home-electronics information terminals by a mobile communication terminal with IC card, wherein in an automatic control mode the IC card determines that the mobile communication terminal moves out of a residential area based on a positional information of the mobile communication terminal, and wherein the mobile communication terminal sends a command to a home-electronics information terminal with wireless communication function installed in a house via a mobile communication network to set the home-electronics information terminal to a preset Going-out status when the IC card determines that the mobile communication terminal moves out of the residential area. By this system, the user does not forget switching off or does not make erroneous setting of the home-electronics information terminal when he or she goes out of the residential area.

According to still another aspect of the present invention, there is provided a remote control system for remotely controlling home-electronics information terminals by a mobile communication terminal with IC card, wherein in the automatic control mode the IC card determines that the mobile communication terminal moves into a residential area based on a positional information of the mobile communication terminal, and wherein the mobile communication terminal sends a command to a home-electronics information terminal with wireless communication function installed in a house via a mobile communication network to set the home-electronics information terminal to a preset Staying status when the IC card determines that the mobile communication terminal moves into of the residential area.

By this system, when the user goes into the residential area, the home-electronics information terminal can be powered on, in advance, or set to a predetermined setting condition in advance.

According to still another aspect of the present invention, there is provided a remote control system for remotely controlling home-electronics information terminals by a mobile communication terminal with IC card, wherein the mobile communication terminal operates in an automatic control mode and a manual control mode. In a manual control mode, the user can operate the mobile communication terminal with IC card within a house or from a remote place and deliberately change a setting of the specified home-electronics information terminal with wireless function installed in the house By this system, the user can control the power ON/OFF and/or various setting of the home-electronics information terminal installed in a house within the house or from a remote place.

According to still another aspect of the present invention, there is provided a remote control system for remotely controlling home-electronics information terminals by a mobile communication terminal with IC card, wherein the IC card includes: a subscriber identification module for using a mobile communication network; a setting means for setting an identification number, such as acceptable telephone number, to designate the home-electronics information terminal to be remotely controlled and to inhibit remote control for all of the home-electronics information terminals; and an executing means for executing a setting change command received from the mobile communication terminal.

By this system, it is possible to avoid a third person to remotely control the home-electronics information terminal installed in the house. In addition, the user can remotely control the home-electronics information terminal from the mobile communication terminal having a preset telephone number.

According to still another aspect of the present invention, there is provided a remote control system for remotely controlling home-electronics information terminals including a mobile communication terminal with IC card including a subscriber identification module, wherein the mobile communication terminal communicates with a home-electronics information terminal with IC card, and wherein a security is ensured during the communication between the mobile communication terminal and the home-electronics information terminal by a key producing function for an encrypted communication and an electronic signature function for identification and authentication provided by the subscriber identification module in the IC cards installed in both the mobile communication terminal and the home-electronics information terminal.

By this system, the user can safely remote-control the home-electronics information terminal in the house from the mobile communication terminal without the need to introduce new security system.

According to still another aspect of the present invention, there is provided a mobile communication terminal used in the above remote control system including: (1) a wireless communication function for communicating with a mobile communication network; (2) a unit for detecting location information; (3) a unit for notifying a change of the location information to the IC card when the change is detected; (4) a unit for executing various commands received from the IC card; (5) means for communicating with the IC card; (6) means for connecting and communicating with the home-electronics information terminal with wireless communication function installed in the house; and (7) a unit for setting condition necessary for remote control of the home-electronics information terminals installed in the house via physical buttons or soft keys through a screen on the mobile communication terminal. By using this mobile communication terminal, the above remote control system can fully function.

According to still another aspect of the present invention, there is provided an IC card used in the above remote control system including: (1) a unit for identifying subscribers; (2) a event setup unit for setting, when the mobile communication terminal detects change of the location information, the mobile communication terminal to notify the change of the location information; (3) a unit for comparing the location information, such as cell ID, received from the mobile communication terminal with residential area information and area status information stored in the IC card when the change is notified and for requesting to the mobile communication terminal to connect and send a command to the home-electronics information terminal with wireless communication function installed in the house to set to a preset Going-out status when it is determined that the mobile communication terminal moves out of the residential area; and (4) a unit for comparing the location information received from the mobile communication terminal with residential area information and area status information stored in the IC card when the change is notified and for requesting to the mobile communication terminal to connect and send a command to the home-electronics information terminal with wireless communication function installed in the house to set to a preset Stay status when it is determined that the mobile communication terminal moves into the residential area. By this IC card, the above remote control system can fully function.

DETAILED DESCRIPTION OF THE PREFERRED EMBODIMENTS

This invention provides a remote control system for remotely controlling a home-electronics equipment (note that a home-electronics equipment having a wireless communication function and a remote control function is referred to as "a home-electronics information terminal" throughout this specification) utilizing an IC card and a mobile communication terminal, as well as the IC card and the mobile communication terminal suitably used for the remote control system.

First of all, the system according to the present invention will be described. The system of the present invention operates in two modes, i.e., an automatic control mode and a manual (conscious) control mode.

The automatic control mode is adopted to mainly avoid a user forgetting switching off the home-electronics information terminals or locking the door when the user goes outside, as well as switching on or setting the condition of the home-electronics information terminals when the user comes home, thereby improving the convenience of controlling such terminals. Specifically, the system utilizes the position detection function of the mobile communication terminal with the IC card to control the home-electronics information terminals in the house so as to automatically switch off or set the condition of the terminals when the user is outside, and to automatically switch on or set the condition of the home-electronics information terminals when the user comes home.

The automatic control mode can be validated and invalidated by the manipulation of the mobile communication terminal by the user.

On the other hand, in a consciously operated mode, could be said as the manual control mode, a user consciously controls the home-electronics information terminal via the mobile communication terminal. As an example of application, a locking system of a car having a communication function can be remotely controlled in the manual control mode. In both modes, it is characterized that the control of the home-electronics information terminals, e.g., changing the setting of the terminals, switching on and off the terminals, remotely locking and unlocking the terminals, or checking the setting or status of those terminals, is carried out based on the information installed in the IC card of the mobile communication terminal via a network of a communication undertaker or enterprise, and not via a local wireless communication. This is advantageous in that private wireless communication facilities are not necessary because the network of the communication undertaker or enterprise is used.

Next, with reference to the drawings, the description will be given of a remote control system utilizing a mobile communication terminal and an IC card according to the present invention.

Figure 1:
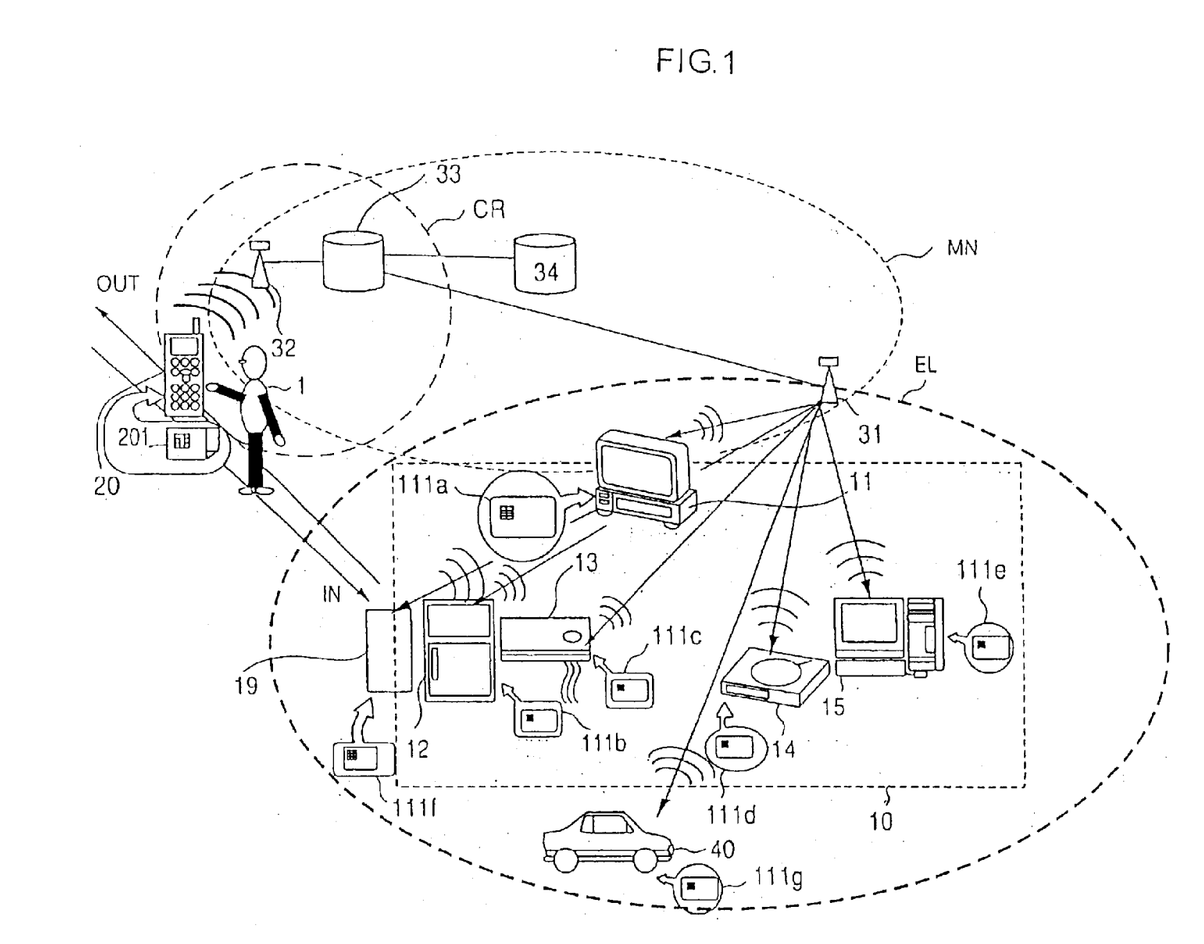
FIG. 1 is a diagram showing an automatic control mode of a system according to the present invention.

FIG. 1 is a diagram showing the automatic control mode of the remote control system according to the present invention.

In FIG. 1, a house 10 of a user 1 is shown as a box of broken line. Various home-electronics information terminals are installed in the house 10, and each of them is equipped with an IC card having a subscriber identification module necessary for utilizing the mobile communication network. The IC cards installed in the home-use information electric terminals may be formed in a Plug-in size, about a size of a thumb, to be incorporated into the terminal, or may be formed in a credit card size to be inserted into a slot of the terminal.

Also, the IC card 201 is installed in the mobile communication terminal 20 owned by the user 1. The IC card 201 may be formed in a Plug-in size, about a size of a thumb, to be incorporated into the terminal, or may be formed in a credit card size to be inserted into a slot of the terminal 20.

Each subscriber identification module is allotted with an identification number, called IMSI (International Mobile Subscriber Identity), for the identification and authentication to the mobile communication network. By registering the identification number or another identification number, such as a telephone number, associated with the identification number to the mobile communication terminal, the corresponding home-electronics information terminal can be remotely controlled.

On the side of the home-electronics information terminal, by registering a receivable telephone number, it is possible to restrict the mobile communication terminals that can be remotely controlled. This prevents a third person from remotely controlling the terminals without permission.

The remote control is executed such that the mobile communication terminal establishes a connection to a home-electronics information terminal to be controlled via the mobile communication network and transmits commands according to the predetermined format and procedure after the connection is established. When the operation is completed, a notification of the completion is transmitted to the mobile communication terminal.

The home-electronics information terminals with wireless communication function installed in the house include, for example, a TV set 11, a refrigerator 12, an air conditioner 13, a game machine 14 and a personal computer 15.

Each home-electronic information terminal has, not only a wireless communication module for the communication with the mobile communication network, but also an IC card including the subscriber identification module as well as a software necessary for the remote control system, in advance.

The software confirms whether or not the sender of the connection requested is registered in advance, manages the operational condition of the terminal (e.g., temperature setting, power ON/OFF, etc.), interprets and executes the remote control commands sent from the mobile communication terminal, and makes a response to the mobile communication terminal after completing the processing.

On the other hand, an electronic lock 19 with wireless communication function may be attached to the door of the house 10 to remotely control the electronic locking and unlocking operation of the door. The electronic lock 19 also belongs to the home-electronics information terminals that have in advance, not only the wireless communication module for communicating with the mobile communication network, but also an IC card 111$f$ with the subscriber identification module and a software necessary for the remote control system.

A car 40 with wireless communication function is parking near the house 10. The car 40 has an IC card 111$g$, and receives commands from the user to execute necessary operations (e.g., locking and unlocking the car). In this specification, the car 40 with wireless communication function is one of the home-electronics information terminals.

Further, in FIG. 1, the house 10 is located in a cell area EL of the base station 31 and receives communication radio wave from the base station 31.

The user frequently moves between the house 10 and the neighboring area in which the base station 32 is located. A thick broken ellipse EL surrounding the house 10 indicates the cell area EL of the base station 31, and similarly a broken circle indicates the cell area CR of the neighboring base station 32.

A base station controller 33 is installed in the base station 32, and an exchange 34 is connected to the base station controller 33 to establish the connection with other mobile communication terminals and/or normal telephones.

The base stations 31 and 32 constitute a mobile network MN, and when the user 1 sends a command by the mobile communication terminal 20 from the neighboring cell area where the base station 32 is located, the command is sent to the respective home-electronics information terminals via the base station 32, the base station controller 33, the exchange 34 and the base station 31.

In the mobile communication network, generally, the base station is constantly broadcasting the location information, such as its cell ID, allotted to the cell area. When the mobile communication terminal is powered on within the mobile communication network, the mobile communication terminal receives the broadcasting location information and compares the received location information with the last location information that has been stored in the IC card installed in the mobile communication terminal. If the new location information and the last location information are identical, the mobile communication terminal becomes ready status. If the new location information and the last location information are not identical, the mobile communication terminal recognizes the movement, and registers the new location information to the mobile communication network. Once the mobile communication terminal completes the registration of the location information to the mobile communication network, after that, the mobile communication terminal updates the registered location information every time when it moves into other area or at a specific time period when no change occurs.

With the above location information registration, the exchange 34 installed in the mobile communication network can recognize the current location information of the mobile communication terminal, and can call out a specific mobile communication terminal based on the current location information.

The mobile communication terminal selects the base station to be connected based on the receiving output of the radio wave and the like, so that the optimum communication quality can be obtained. If the base station under connection is changed, the location information in the received radio wave changes. Therefore, the mobile communication terminal continuously monitors the location information in the received radio wave to detect the changes of the cell area, and this triggers off the updating of the registered location information in the mobile communication network.

The system of the present invention has a function to continuously monitor the location information in the received radio wave of the mobile communication terminal to detect the change of the cell area.

There is a standard of a mechanism using mobile communication terminals and IC cards called "SAT (SIM Application Toolkit)" which is presently adopted mainly in European countries. The SAT aims to provide added-value service using the mobile communication network, and is expanded in the third generation mobile communication standard under the name of USAT (USIM Application Toolkit) or CAT (Card Application Toolkit).

By using a mobile communication terminal and an IC card in conformity with SAT, the IC card, that could operate only after receiving command from the terminal side so far, can actively send commands to the mobile communication terminal. The mobile communication terminal may be set such that, if a specific event (e.g., change of cell area) takes place, that fact can be notified to the IC card.

The IC card used in the system of the present invention stores residential cell information such as the cell ID in the cell area EL, area status information (indicating whether the user is staying in or out of the residential area), automatic control mode ON/OFF setting information and identification number (e.g., telephone number) of the home-electronics information terminal subject to the remote control. In addition, the IC card is in conformity with SAT or SAT-like system, and is designed to issue instruction, in advance, to the mobile communication terminal to notify the change of the cell area.

The mobile communication terminal is also in conformity with SAT or SAT-like system, and is designed to immediately notify the change of the cell area, when it occurs, to the IC card after the instruction to do so is given by the IC card.

By way of a general example, 3GPPTS31.111, which is a USAT standard by 3GPP (3rd Generation Partnership Project) of the determination group of the 3rd-generation mobile communication standard, calls this system as "Event download mechanism".

When receiving the notification of the cell area change from the mobile communication terminal 20, the IC card 201 compares the location information such as the cell ID received together with the notification and the area status information (indicating whether the user is in or out of the residential area) with each other to judge whether the user goes out of the residential area or goes into the residential area, i.e., whether the area status information is changed, and then notifies the result of the judgment to the mobile communication terminal.

The mobile communication terminal 20 does nothing if it receives the notification indicating that the area status information is not changed. On the other hand, if the mobile communication terminal 20 receives the notification, from the IC card, indicating that the user went out of or into the residential area, the mobile communication terminal 20 connects to the subject home-electronics information terminal via the mobile communication network and sends an appropriate command.

Specifically, the mobile communication terminal 20 sends a command to set the home-electronics information terminal to Going-out mode when the user goes out of the residential area, and sends a command to set the home-electronics information terminal to Staying mode when the user comes into the residential area. The mobile communication terminal 20 establishes the connection with the home-electronics information terminal with wireless communication function installed in the house based on the identification information such as telephone number. After the home-electronics information terminal completes the command received from the mobile communication terminal 20, it returns a termination notification to the mobile communication terminal 20.

In FIG. 1, the user stays in the cell area neighboring to the cell area EL of the house 10, and the mobile communication terminal 20 with the IC card 201 is automatically controlling the home-electronics information terminals in the house 10. The cell ID of the cell area EL is stored in the IC card 201 as the residential area information. When the user goes out and enters the neighboring cell area CR as shown by the arrow "OUT", the mobile communication terminal 20 detects the ID of the neighboring cell (i.e., cell ID of the base station 32) to notify the fact to the IC card 201 and waits for a return. When receiving the cell change notification from the mobile communication terminal 20, the IC card 201 checks the residential area information stored therein and then checks the area status information.

In this case, the cell ID of the cell area EL of the house 10 and the area status are both indicating the Staying status, therefore the IC card notifies the mobile communication terminal to send the command to set the home-electronics information terminals to the Going-out status. When receiving the command, the mobile communication terminal connects to the subject home-electronics information terminal and sends appropriate commands.

On the contrary, when the user is on the way home and enters the cell area EL from the neighboring area CR as shown by the arrow "IN", the mobile communication terminal 20 detects the cell ID of the cell area EL (i.e., the cell ID of the base station 31) when the user enters the cell area EL of the house 10, notifies the fact to the IC card 201 and then waits for a return. When receiving the cell change notification from the mobile communication terminal 20, the IC card 201 checks the residential area information stored therein and then checks the area status information (indicating whether the user is in the residential area or not). In this case, the cell ID of the cell area EL of the house 10 and the area status information are both indicating the Going-out status, therefore the IC card 201 notifies the mobile communication terminal 20 to send the commands to set the home-electronics information terminals to the Staying status. When receiving the command, the mobile communication terminal 20 connects to the subject home-electronics information terminal and sends appropriate commands.

The above operation is executed while the user is unconscious of it, unless the user 1 manipulates the mobile communication terminal to deliberately invalidate the automatic control function. The automatic control is executed even while the user is talking by the mobile communication terminal.

If people such as user's family members stay in the house 10, the automatic control mode may inappropriately work, and hence the automatic control mode appears to be suitable for a single person or in user's absence. In order to avoid the above-mentioned problem in advance, the user can deliberately manipulate the mobile communication terminal to invalidate the automatic control function.

It is noted that, if it is desired to set broader residential area, the residential area may include not only the cell ID of the cell area EL but also the cell IDs of surrounding areas. In that case, the user coming home can set the home-electronics information terminals to the Staying mode at an earlier timing, and so the condition in the house 10 may be comfortable when the user reaches the house 10, e.g., the room is already warm or the bath is ready.

If it is desired to restrict the mobile communication terminals to be remotely controlled, then the user can register the identification number such as telephone number of the mobile communication terminal to the home-electronics information terminal for which the remote control is permitted, and the user can completely invalidate the whole remote control function for the home-electronics information terminal.

Figure 2:
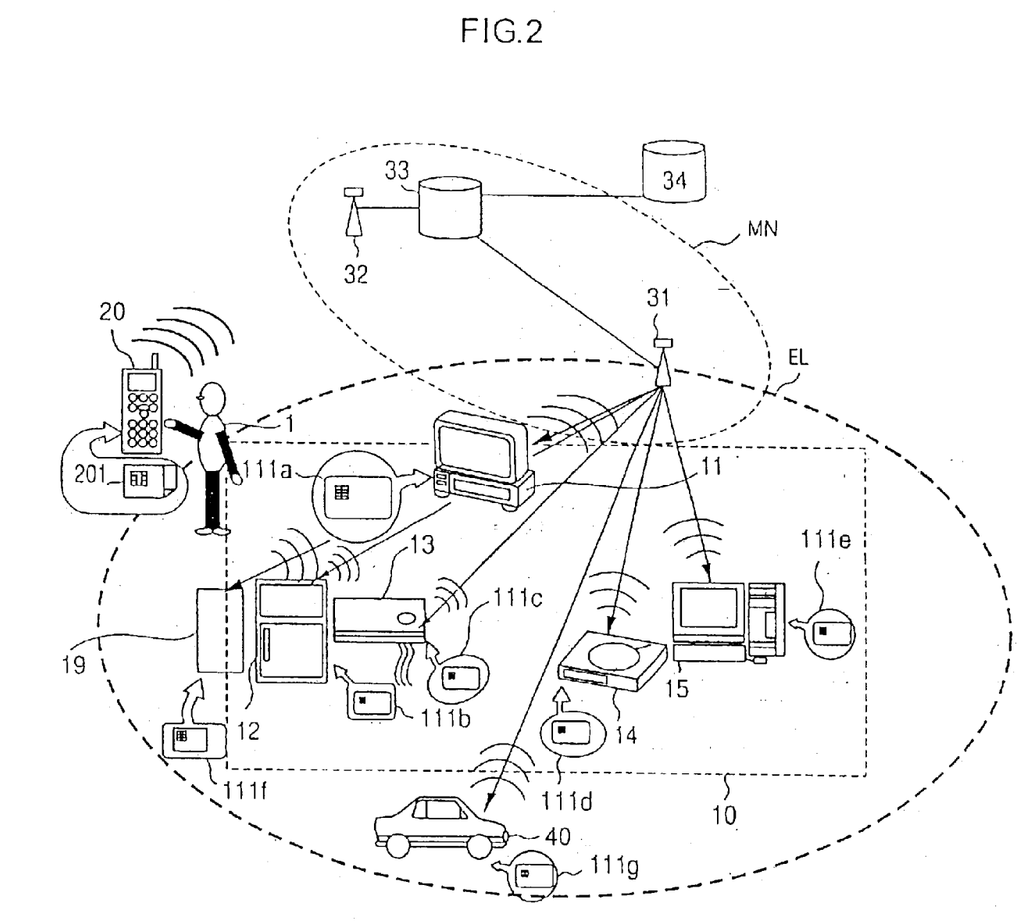
FIG. 2 is a diagram showing a manual control mode of a system according to the present invention.

FIG. 2 shows the manual (conscious) control mode according to the present invention.

In FIG. 2, similarly to FIG. 1, the broken rectangle shows the house 10 of the user 1, and various home-electronics information terminals with wireless communication function are installed in the house 10. The home-electronics communication terminals 11 to 15, the electronic lock 19 and the car 40 with wireless communication function are all identical to those shown in FIG. 1.

In FIG. 2, the house 10 is located in the cell area EL of the base station 31, and the base station 31 and the other base stations including the base station 32 constitute the mobile network MN.

The manual control mode is characterized in that the user 1 can deliberately and remotely control the subject home-electronics information terminals through the screen and using buttons and/or soft keys on the mobile communication terminal 20, regardless of whether the user is in or out of the cell area EL. In this manual control mode, not only switches between the Going-out status and the Staying status, set in advance, but also setting appropriate condition for a specific home-electronics information terminals can be achieved.

In the automatic control mode, the trigger for the operation is the detection of the location information such as the cell ID. On the contrary, in the manual control mode, the trigger for the operation is the deliberate control and manipulation of the mobile communication terminal by the user through the screen thereof.

In addition, in the automatic control mode, since the specific condition is determined in advance in the home-electronics information terminal as the setting for the Going-out mode and the Staying mode, the data field in the command from the mobile communication terminal does not include data associated with the condition setting. On the contrary, in the manual control mode, the software on the mobile communication terminal stores the specific condition setting, such as temperature value, accepted through the screen on the mobile communication terminal into the data field within the command, and then the software sends the command to the home-electronics information terminal.

Further, in the manual control mode, the user can individually and separately set the condition for each home-electronics information terminal at any timing.

In the manual control mode, other matters are the same as those in the automatic control mode.

Figure 3:
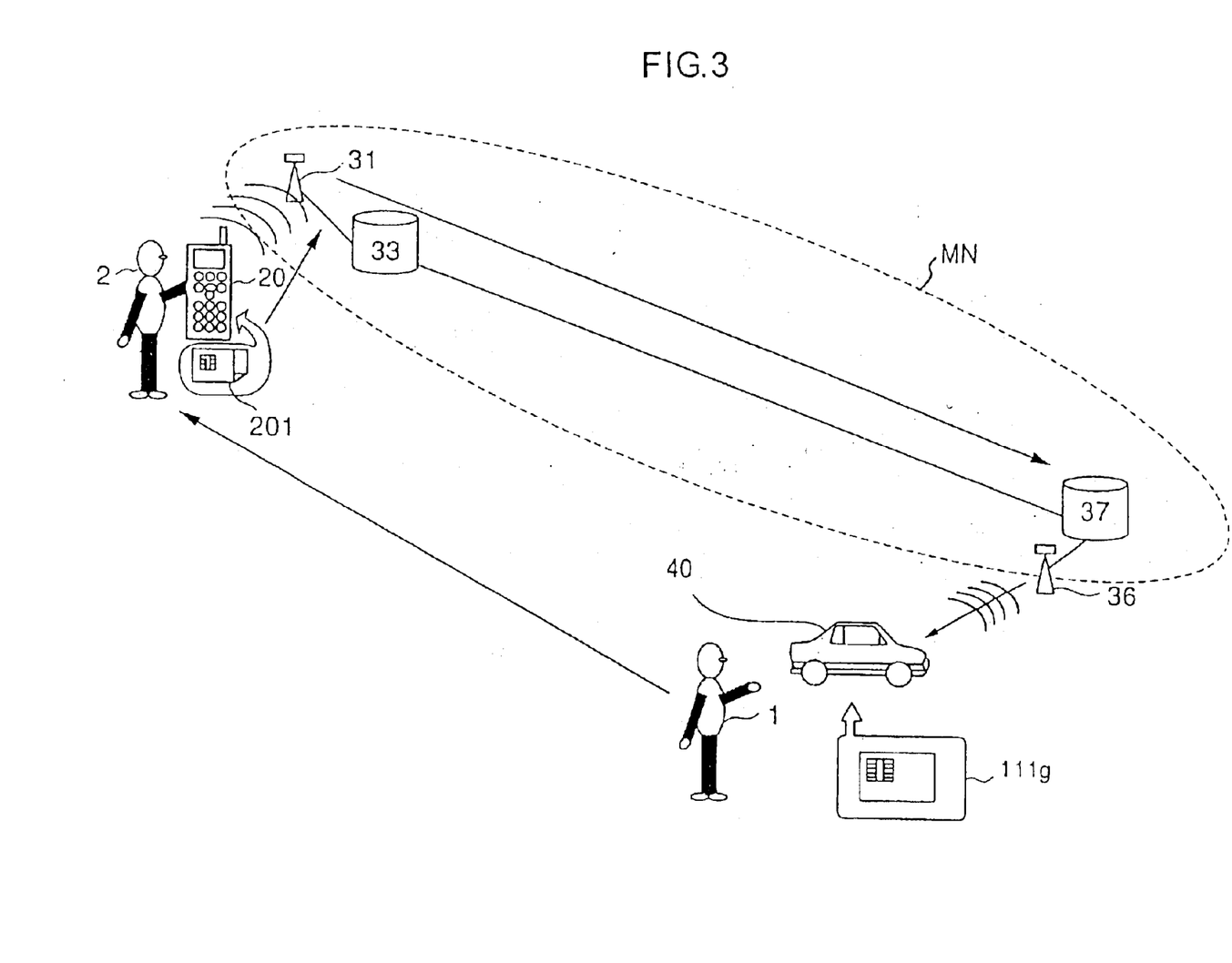
FIG. 3 is a diagram showing an example in which the manual control mode is applied to a car with wireless communication function.

FIG. 3 shows an example in which the manual control mode is applied to a car with wireless communication function.

In FIG. 3, the user 1 drives the car 40 to a suburban area, but the user 1 left the key of the car or the mobile communication terminal used as the key within the car 40 and locked the car 40, and so he or she cannot drive the car 40. The car 40 locates in the area of the base station 36. The user 1 telephones the family member 2 and asks him or her to manipulate his or her mobile communication terminal 20. It is assumed that, for the car 40, the remote control is permitted only by the mobile communication terminal 20 of the user 1 and the family member 2 are permitted.

When the family member 2 sends the lock release command using his or her mobile communication terminal 20 with the IC card 201, the command is transmitted to the car 40 via the base stations 31 and 36.

The car 40 with wireless communication function receives the command, and unlocks the car 40 after executing the necessary processing. In this way, the user can drive the car 40.

While the family member helped the user by manipulating the mobile communication terminal 20 in this example, other person such as a third-person of a service company executing such business can do the same job.

Figure 4:
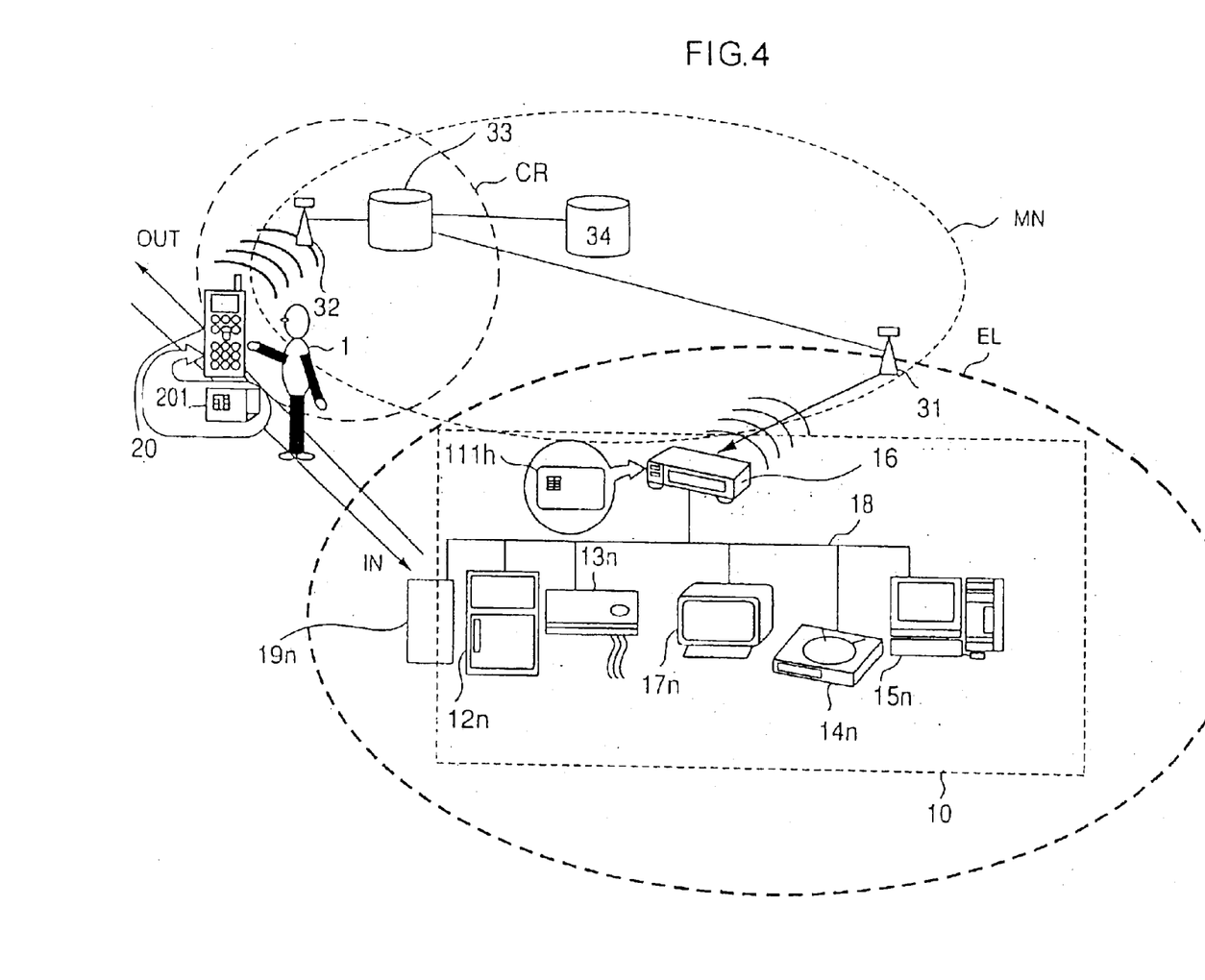
FIG. 4 is a diagram showing an example of the automatic control mode when a home network is applied to the system of the present invention.

FIG. 4 shows an example of executing the automatic control mode when the system of the present invention is applied to a home network.

Namely, FIG. 4 shows the example of a remote control system (automatic control mode) in which the home network 18 is established in the house 10, and a set-top box 16 storing control information of the respective home-electronics information terminals to be remotely controlled is used to centrally manage the home network 18.

The home-electronics information terminals to be controlled, such as the refrigerator 12n, the air conditioner 13n, the game machine 14n, the personal computer 15n, the TV monitor 17n, are connected to the set-top box 16 with wireless communication function, via wireless or wired connection.

With this arrangement, the operation of the home-electronics information terminals, such as the condition setting, may be performed at one place, and the respective home-electronics information terminals do not need to have the IC card and wireless communication function, individually, for using the mobile communication network. Therefore, this remote control system is effective in view of convenience and cost performance.

In comparison with the case where the home network 18 is not installed, only the set-top box 16 with wireless communication function establishes connection via the mobile communication network, the respective home-electronic information terminal should use, not the identification number allotted in the mobile communication network, but the local identification number allotted within the home network 18. Further, the respective home-electronics information terminal transmits the commands only with the set-top box 16, so the conditional setting of the plural home-electronics information terminals have to be done by a single command. Therefore, it is necessary to adopt different command format.

Other matters are the same as the remote control system that does not have the home network in the house.

Next, specific application of the present invention in the respective modes will be described.

(1) In the automatic control mode, the mobile communication terminal (cellular phone) 20 is set to the automatic control mode, and there are following cases:

(a) The home-electronics information terminals automatically sets to the Going-out status when the user goes out with the cellular phone; and (b) The home-electronics information terminals automatically sets to the Staying status when the user comes back home with the cellular phone.

(2) On the other hand, in the manual control mode, the mobile communication terminal (cellular phone) is set to the manual mode, and there are following cases:

(a) In the house, the user sets the condition necessary for the remote control of the home-electronics information terminals with wireless communication function installed in the house by manipulating the physical button or soft key through the screen on the cellular phone deliberately;

(b) From outside of the house, the user sets the condition necessary for the remote control of the home-electronics information terminals with wireless communication function installed in the house by manipulating the physical button or soft key through the screen on the cellular phone deliberately;

(c) In the house, the user heats or cools the inside of the car with wireless communication function existing in the residential area, in advance, or heats the car windows to defrost by manipulating the physical button or soft key through the screen on the cellular phone deliberately; and (d) From outside of the house, a family member or a third person to remotely unlock the car when the user has left the key of the car inside the car with wireless communication function and asks to do so.

In the automatic control mode, both the mobile communication terminal and the car with communication function have a means to read out the IC card. In the IC card, the subscriber identification module for using the mobile communication network is stored, and further necessary information, such as the name and/or the necessary operation setting of each of the home-electronics information terminals subject to the remote control by the remote control system of the present invention.

In the IC card, the temperature control of the air conditioner, the temperature of hot water in the bath, the password of the electronic lock, etc. are individually set, and those setting information may be locally changed at any time (for example, by the display screen of the mobile communication terminal). In addition, the remote control of the electronic locking or unlocking may be performed.

Next, the description will be given of the mobile communication terminal and its function.

Figure 5:
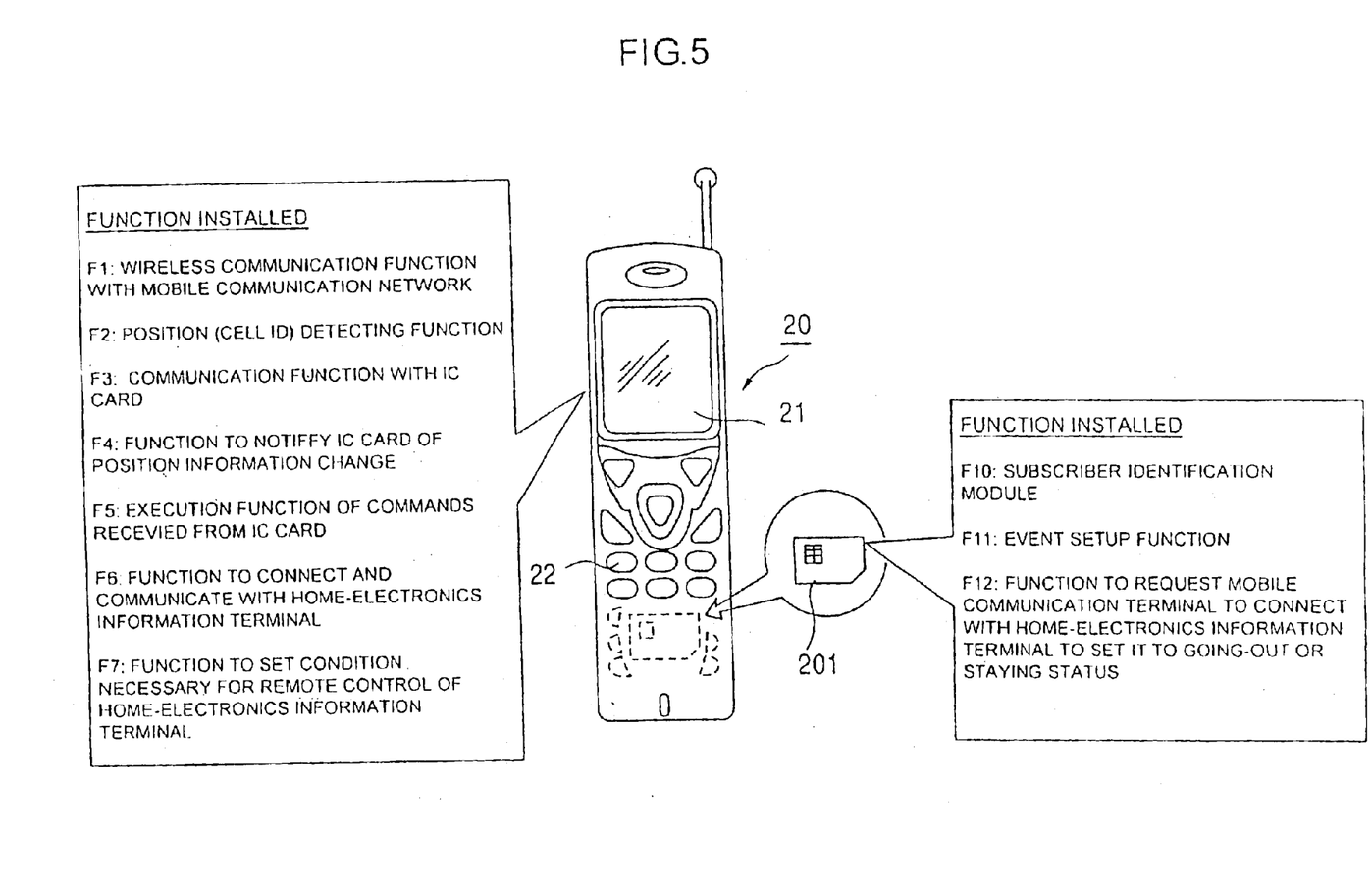
FIG. 5 is a diagram showing an example of a mobile communication terminal.
Figure 6:
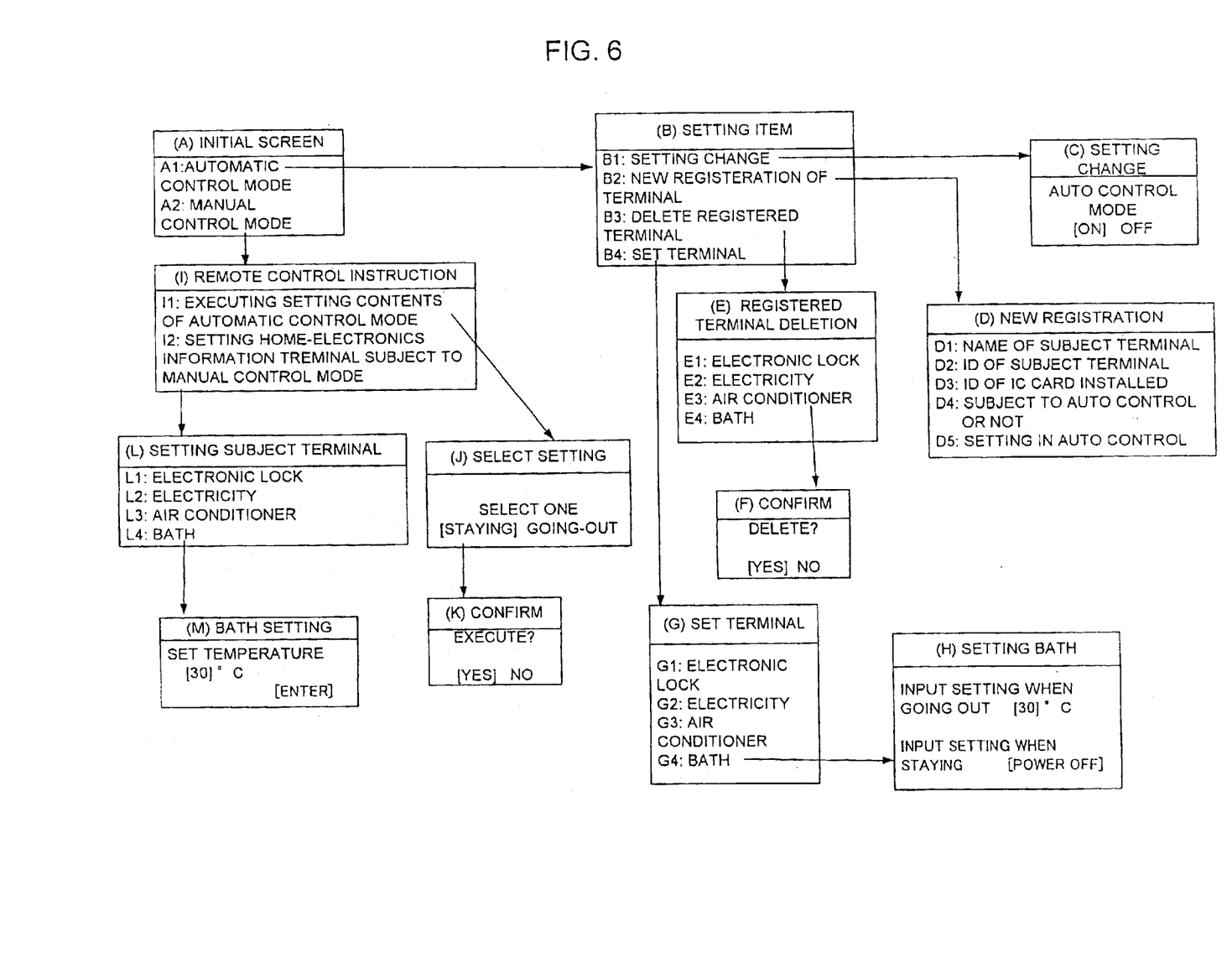
FIG. 6 shows an example of menu of the mobile communication terminal.
Figure 7:
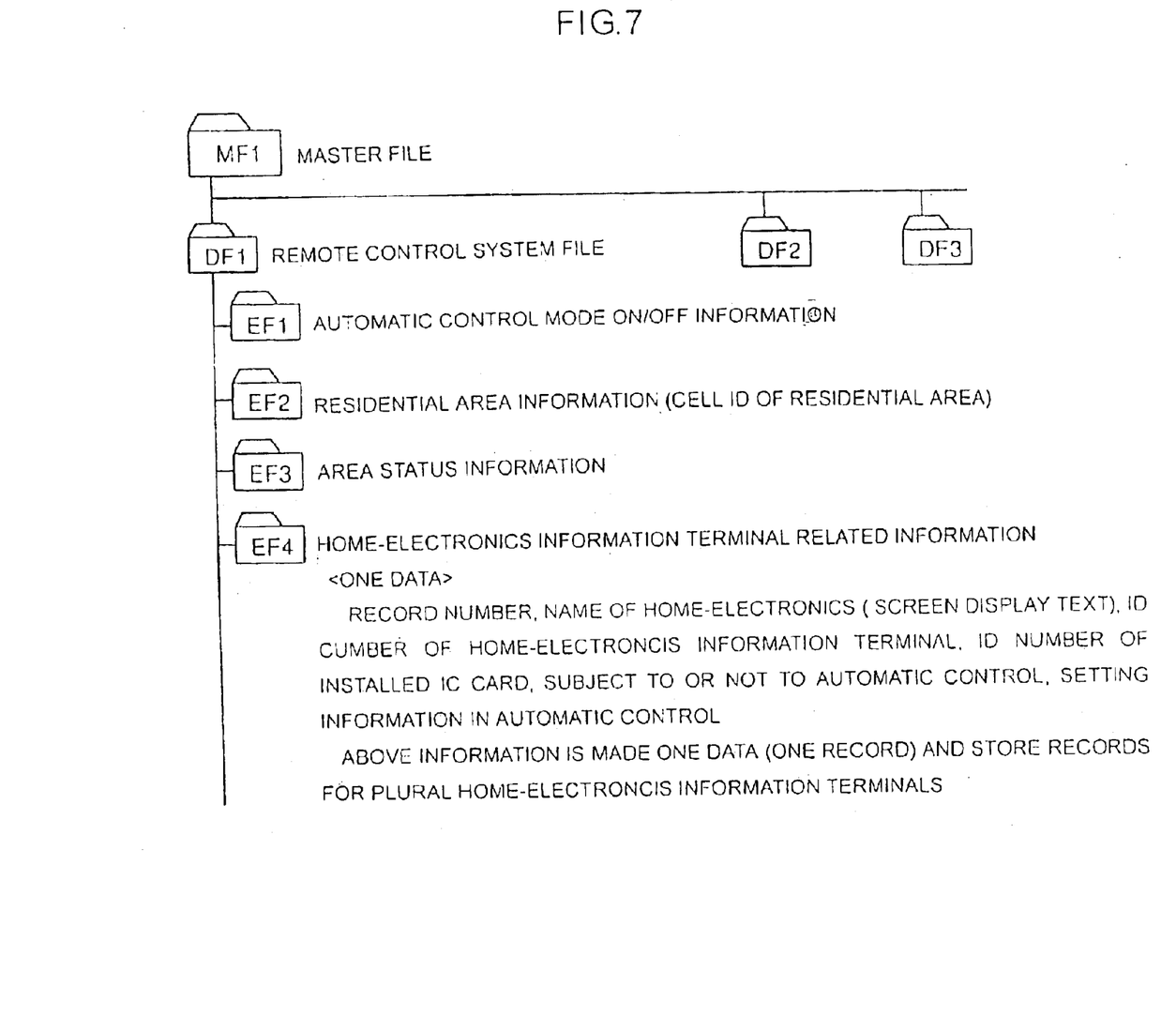
FIG. 7 is a diagram showing an example of file structure of an IC card installed in the mobile communication terminal.

FIG. 5 is a diagram showing an example of the mobile communication terminal, FIG. 6 is a diagram showing an example menu of the mobile communication terminal, and FIG. 7 is diagram showing an example of file structure in the IC card installed in the mobile communication terminal.

As shown in FIG. 5, the mobile communication terminal 20 has (1) a wireless communication function between a general terminal and the mobile communication network, (2) a location information (e.g., cell ID) detecting function, (3) a communication function with IC card since the IC card is installed therein, (4) a function to notify the change of the location information to the IC card, (5) a function to execute various command received from the IC card and (6) a function to connect and communicate with the home-electronics information terminal.

Further, the mobile communication terminal 20 has (7) a function to set necessary condition for the remote control of the home-electronics information terminals.

On the other hand, the IC card 201 has (1) a subscriber identification module which is indispensable at the time of connecting to the mobile communication network, (2) an event set-up function to set the mobile communication terminal to notify that the mobile communication terminal detects the change of the location information when the change takes place, and (3) a function to request the mobile communication terminal to send a command to connect to the home-electronics information terminal to change the status to the Going-out status or Staying status.

As shown in FIG. 6, in the display of the mobile communication terminal, (1) the automatic control mode and (2) the manual control mode may be selected in the initial screen (A).

If the user selects (1) the automatic control mode, the setting item screen (B) is shown, and the user can select (1) the setting change (from ON to OFF, or from OFF to ON), (2) new registration of subject home-electronics information terminal, (3) deletion of the subject home-electronics information terminal and (4) the setting of the subject home-electronics information terminal.

In the setting item screen (B), if the user selects (1) the setting change, the setting change screen (C) is shown. The setting change screen (C) shows the current mode, and the user can change ON to OFF, or OFF to ON by manipulating the mobile communication terminal. If the mobile communication terminal, which the automatic control mode is OFF goes out of or comes into the residential area, the mobile communication terminal makes no action to the home-electronics information terminal. In order to operate the condition setting of the home-electronics information terminal when the automatic control mode is OFF, the user has to use the manual control mode.

In the setting item screen (B), if the user selects (2) the new registration of home-electronics information terminal, the new registration screen (D) is shown. In this screen, the user can set, via the physical button or soft key through the screen of the cellular phone, (1) the name of the subject home-electronics information terminal, (2) the identification number of the home-electronics information terminal, (3) the identification number of the installed IC card, (4)information indicating whether the home-electronics information terminal is or is not subject to the automatic control and (5) the setting information at the time of the automatic control.

In the setting screen (B), if the user selects (3) the deletion of the subject home electronics information terminal, the registration deletion screen (E) is shown, and when the user selects one of the home-electronics information terminals in the list shown on the screen (E), the deletion confirmation screen (F) is shown. When the user selects "YES" in the screen, the deletion is executed.

In the setting item screen (B), if the user selects (4) setting the subject home-electronics information terminal, the setting screen of subject home-electronics information terminal (G) is shown. This screen includes a list of home-electronics information terminals registered as the subject of the remote control. When the user selects one of the home-electronics information terminal for which the setting is to be changed ("BATH" in FIG. 6), the setting screen of the selected home-electronics information terminal (H) is shown, and the user can select the Going-out status and the Staying status in the automatic control mode.

In the initial screen (A), if the user selects (2) the manual control mode, the remote control instruction screen (I) is shown, and the user can select (1) the execution of setting contents of automatic control mode and (2) the setting of the home-electronics information terminal subject to the manual control mode.

In the remote control instruction screen (I), if the user selects (1) the execution of setting contents of automatic control mode, the setting selection screen (J) is shown, and the user can select one of the Staying status and the Going-out status for the automatic control mode. When one of them is selected, the execution confirmation screen (K) is shown. When the user selects "YES" in the execution screen (K), the home-electronics information terminal is changed to the status selected in the selection screen (J).

In the remote control instruction screen (I), if the user selects (2) the setting of the home-electronics information terminal subject to the manual control mode, the setting screen of the subject home-electronics information terminal (L) is shown.

When the user selects the home-electronics information terminal which setting is to be changed ("BATH" in FIG. 6), the setting screen (M) of the selected home-electronics information terminal ("BATH" in FIG. 6) will appear. When the user inputs an arbitrary setting value and presses the execute button in the screen (M), the setting of the home-electronics information terminal is changed to the inputted setting value.

As shown in the file structure in the IC card installed in the mobile communication terminal shown in FIG. 7, under the master file MF1, a file DF1 for remote control system is stored in parallel with the files DF2 and DF3 used for other services. Under the file DF1 for remote control system, there are a file EF1 for automatic control mode ON/OFF information, a file EF2 for residential area information (cell ID of residential area), a file EF3 for area status information (indicating whether the mobile communication terminal is in or out of the residential area) and a file EF4 for the home-electronics related information.

In the file EF4 for the home-electronics related information, specific data of the home-electronics terminal subject to the remote control is stored as one data (one record). The records of the one data may be, for example, the name of the home-electronics, the identification number of the home-electronics information terminal, the identification number of the installed IC card, the information indicating whether the terminal is or is not subject to the automatic control and setting information at the time of automatic control. The above information constitutes as one data (one record), and records for each of the plurality of home-electronics information terminal are stored.

It is noted that the above file structure shown in FIG. 7 is merely an example. Other type of IC card may take different file structure, but it includes the same information as above even if the type of the IC card is different.

The procedure of the remote control command is as follows:

(1) Trigger Generation

In the automatic control mode, the trigger is generated when the mobile communication terminal with the IC card detects that the mobile communication terminal goes out or comes into the residential area.

In the manual control mode, the trigger is generated when the user deliberately instructs the setting change by manipulating the physical button or soft key through the screen on the cellular phone.

(2) Connection to the Subject Home-Electronics Information Terminal

When the trigger is generated, the mobile communication terminal with the IC card identifies the subject home-electronics information terminal or terminals, specifies the identification number (for example, identification number such as IMSI allotted to the subscriber identification module in the IC card installed) of the home-electronics information terminal, and then establishes the connection via the mobile communication network.

The normal connection can be established only in the case that the mobile communication terminal issued for the connection request has been set in the home-electronics information terminal subject to the remote control. When the setting has been made such that the remote control of the home-electronics information terminal is inhibited at the time of the connection, the connection is rejected.

(3) Send Setting Change Command

When the mobile communication terminal confirmed that the connection is normally established, the mobile communication terminal sends a command or commands to change setting of the subject home-electronics information terminal.

(4) Execute Setting Change Command

On receiving the setting change command from the mobile communication terminal, the home-electronics information terminal executes necessary processing.

(5) Notify Normal Completion

When the home-electronics information terminal finishes the processing of the setting change command, it notifies the processing completion to the mobile communication terminal.

The home-electronics information terminals described above are merely examples, and it is apparent for the skilled person in the art that the present invention is applicable to other home-electronics equipment such as a boiler for bath, a solar generator, a wind force generator, a solar water heating system, a tap control device for gas or water, a washing machine, a dish washing and drying machine, a cloth drying machine, a house vacuum cleaner, a video/audio recording device, a monitoring device and a lift.

Further, it is also apparent for the skilled person in the art that the present invention is applicable to a motorcycle, a yacht, a small ship, a snowmobile, an outdoor sprinkler, etc.

The remote control system and the mobile communication terminal according to the present invention provide the following advantageous effects.

In the automatic control mode, (1) The user does not forget turning off the powers of the home-electronics devices if the user goes out with the mobile communication terminal.
(2) The user can automatically turn on the home-electronics devices and/or set the home-electronics devices to predetermined status (e.g., turning on the air conditioner or a light, setting the water temperature in bath to 35 centigrade), when coming home, if the user goes out with the mobile communication terminal.
(3) The above operations are executed automatically while the user is unconscious of it, and hence the user does not have to operate by himself.
(4) The user can avoid failure to lock the house if an electronic lock with wireless communication function or a home network is configured and locally connected to a terminal device performing the total control.

It is noted that the above advantageous effects can be obtained under the conditions when the IC card can actively send commands to the mobile communication terminal, the mobile communication terminal has a mechanism to execute the command, the IC cards stores a list of home-electronics information terminals and their settings for the Going-out status and the Staying status, the mobile communication network can transfer the commands received from the mobile communication terminal or the IC card to the home-electronics information terminal to be connected, and the home-electronics information terminal that received the command can execute the processing corresponding to the received command.

In the manual control mode, (1) With the mobile communication terminal, the user can perform remote control such as turning ON/OFF a home-electronics equipment, setting change of such equipment, and locking and unlocking electronic locking system, etc.
(2) By applying this system to a car with wireless communication function, if the user left the car key inside the car and locked, a third person admitted by the user can deliberately unlock the car by using a mobile communication terminal remotely located with watching its screen.

INDUSTRIAL APPLICABILITY

The present invention can be used for a mobile control system to a house or an equipment in a house by using a mobile communication terminal and a IC card fixed therein which provides a system to automatically or consciously switch on and off each home-electronics information terminal installed in the house, change to preset settings, or locking or unlocking an electronic lock by communicating with the home-electronics information terminal installed in the house.

What is claimed is:

1. A remote control system for remotely controlling home-electronic information terminals by a mobile communication terminal with IC card via a mobile communication network, wherein the IC card comprises:

a storing means for storing residential area information and area status information;

a comparing means for comparing a location information received from the mobile communication terminal with the residential area information and the area status information stored in the IC card; and a determining means for determining whether the mobile communication terminal moves into or out of a residential area based on the comparison result of the comparing means, wherein the mobile communication terminal comprises:

a notifying means for notifying the change of the location information including cell ID and the changed location information to the IC card whenever the change is detected;

a commanding means for automatically sending a command to a home-electronics information terminal with wireless communication function installed in a house via a mobile communication network to set the home-electronics information terminal to a preset Going-out status when the determining means determines that the mobile communication terminal moves out of the residential area; and a commanding means for sending a command to the home-electronics information terminal with wireless communication function via the mobile communication network to set the home-electronics information terminal to a preset Staying status when the determining means determines that the mobile communication terminal moves into the residential area, wherein each of the IC card end the home-electronics information terminals has a subscriber identification module for identification and authentication to the mobile communication network, and wherein the home-electronics information terminal which is set to be controllable by the mobile communication terminal is controlled by the mobile communication terminal.

2. A remote control system for remotely controlling home-electronics information terminals by a mobile communication terminal with IC card via a mobile communication network, wherein, in an automatic control mode, the mobile communication terminal sends a command to the home-electronics information terminals with wireless communication function installed in a house via a mobile communication network to set the home-electronics information terminals to a preset Going-out status when a mobile communication terminal with IC card which a user carries with when going out determines that the mobile communication terminal moves out of the residential area, wherein each of the IC card and the home-electronics information terminals has a subscriber identification module for identification and authentication to the mobile communication network, and wherein the home-electronics information terminal which is set to be controllable by the mobile communication terminal is controlled by the mobile communication terminal.

3. A remote control system for remotely controlling home-electronics information terminals by a mobile communication terminal with IC card via a mobile communication network, wherein, in an automatic mode, the mobile communication terminal sends a command to the home-electronics information terminals with wireless communication function installed in a house via a mobile communication network to set the home-electronics information terminals to a preset Staying status when the mobile communication terminal with IC card which the user carries when coming back home determines that the mobile communication terminal moves into of a residential area, wherein each of the IC card and the home-electronics information terminals has a subscriber identification module for identification and authentication to the mobile communication network, and wherein the home-electronics information terminal which is set to be controllable by the mobile communication terminal is controlled by the mobile communication terminal.

4. A remote control system for remotely controlling home-electronics information terminals by a mobile communication terminal with IC card via a mobile communication network, the mobile communication terminal operates in an automatic control mode and a manual control mode, wherein, in a manual control mode, a user operates the mobile communication terminal with IC card which the user carries with within a house or from a remote place to consciously change the setting of the home-electronics information terminal with wireless communication function installed in a specific house, wherein each of the IC card and the home-electronics information terminals has a subscriber identification module for identification and authentication to the mobile communication network, and wherein the home-electronics information terminal which is set to be controllable by the mobile communication terminal is controlled by the mobile communication terminal.

5. A remote control system for remotely controlling home-electronics information terminals by a mobile communication terminal with IC card via a mobile communication network, wherein the IC card comprises:
   a setting means for setting an identification number to designate the home-electronics information terminals to be remotely controlled and to inhibit remote control for all of the home-electronics information terminals; and
   an executing means for executing a setting change when the command is received from the mobile communication terminal, wherein each of the IC card and the home-electronics information terminals has a subscriber identification module for identification and authentication to the mobile communication network, and wherein the home-electronics information terminal which is set to be controllable by the setting means is controlled by the mobile communication terminal.

6. A remote control system for remotely controlling home-electronics information terminals comprising a mobile communication terminal with IC card via a mobile communication network,
   wherein both of the home-electronics information terminals with wireless communication function installed in a house and the mobile terminal includes a subscriber identification module for identification and authentication to the mobile communication network and can communicate each other,
   wherein the home-electronics information terminal which is set to be controllable by the setting means is controlled by the mobile communication terminal, and
   wherein other security techniques would not be necessary for the remote control system by using a security system for a mobile communication network system which is based on a key producing function for an encrypted communication and an electronic signature function for identification and authentication provided by the subscriber identification module in IC cards installed in both the mobile communication terminal and the home-electronics information terminals.

7. An mobile communication terminal used in the remote control system according to any one of claims 1 to 6, comprising:
   means for wireless communication with the mobile communication network;
   means for detecting location information;
   means for notifying a change of the location information to the IC card;
   means for executing commands received from the IC card;
   means for communicating with the IC card;
   means for connecting and communicating with the home-electronics information terminals with wireless communication function installed in a house; and
   means for setting the condition necessary for remote control of the home-electronics information terminals with wireless communication function installed in the house by manipulating a physical button or a soft key through a screen.

8. An IC card used in the remote control system according to any one of claims 1 to 6, comprising:
   means for identifying subscribers;
   event setup means for setting, when the mobile communication terminal detects change of a location information, the mobile communication terminal to notify the change of the location information;
   means for comparing the location information received from the mobile communication terminal with residential area information and area status information stored in the IC card when the change is notified and for sending a command to a home-electronics information terminal installed in a house via a mobile communication network to set the home-electronics information terminal to a preset Going-out status when the mobile communication terminal is determined that the mobile communication terminal moves out of the residential area; and
   means for comparing the location information, including cell ID, received from the mobile communication terminal with residential area information and area status information stored in the IC card when the change is notified and for sending a command to the home-electronics information terminal installed in the house via the mobile communication network to set the home-electronics information terminal to a preset Staying-out status when the mobile communication terminal is determined that the mobile communication terminal moves into the residential area.

* * * * *